United States Patent [19]

Asayama

[11] 4,448,064
[45] May 15, 1984

[54] DEVICE FOR DETECTING THE INTAKE AIR FLOW RATE IN AN INTERNAL COMBUSTION ENGINE

[75] Inventor: Yoshiaki Asayama, Hyogo, Japan

[73] Assignee: Mitsubishi Denki Kabushiki Kaisha, Tokyo, Japan

[21] Appl. No.: 381,660

[22] Filed: May 24, 1982

[30] Foreign Application Priority Data

Nov. 28, 1980 [JP] Japan ................................. 55-169250

[51] Int. Cl.³ .............................................. G01F 1/32
[52] U.S. Cl. ................................. 73/118.2; 73/861.23
[58] Field of Search ............ 73/197, 199, 204, 861.22, 73/861.23, 861.24, 861.93, 861.27, 861.28, 118 A; 123/494

[56] References Cited

U.S. PATENT DOCUMENTS

| | | | |
|---|---|---|---|
| 3,374,673 | 3/1968 | Trageser | 73/204 |
| 4,083,244 | 4/1978 | Agar et al. | 73/204 |
| 4,217,929 | 8/1980 | Pelt | 73/197 X |
| 4,361,119 | 11/1982 | Endo et al. | 123/494 |

FOREIGN PATENT DOCUMENTS

| | | | |
|---|---|---|---|
| 55-65114 | 5/1980 | Japan | 73/118 |
| 55-72630 | 5/1980 | Japan | 73/118 |

*Primary Examiner*—Herbert Goldstein
*Attorney, Agent, or Firm*—Sughrue, Mion, Zinn, Macpeak and Seas

[57] ABSTRACT

An apparatus for measuring the flow rate of intake air into an internal combustion engine is designed such that a conduit mounting ultrasonic sensors can respond quickly to changes in the intake air temperature. In this manner, any modulation of the emitted ultrasonic energy due to temperature effects can be eliminated, such that the device may accurately measure the flow.

6 Claims, 3 Drawing Figures

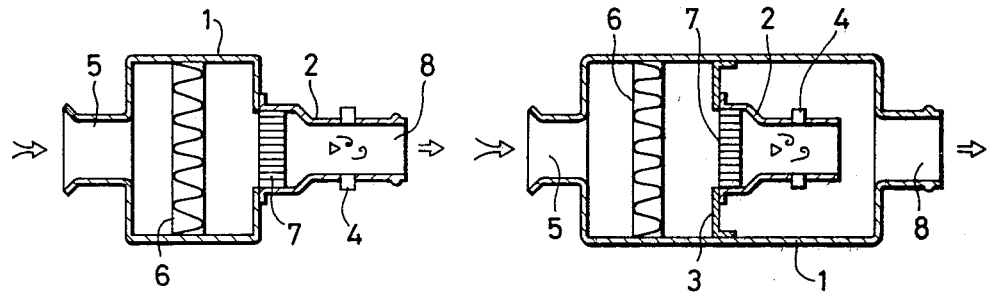
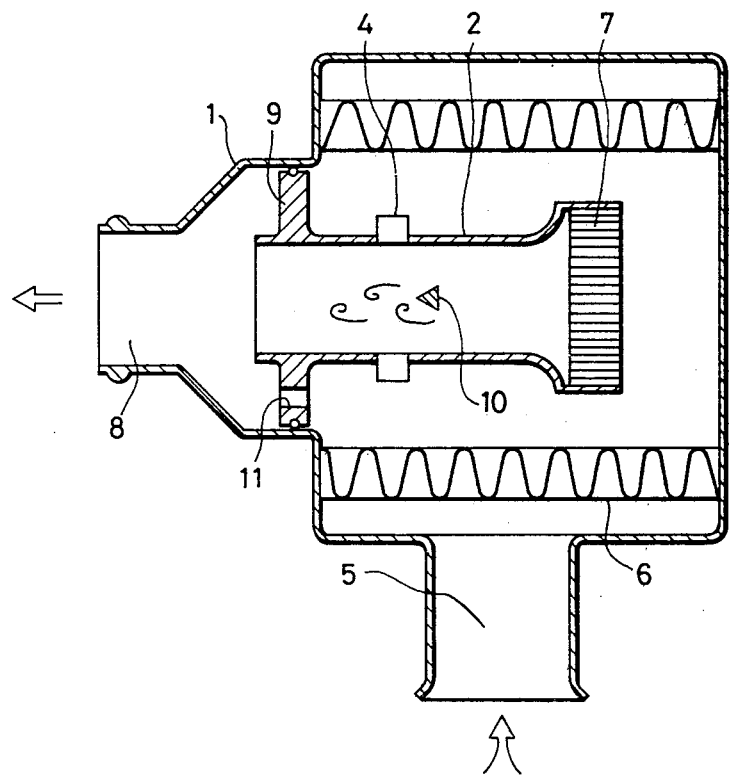

DEVICE FOR DETECTING THE INTAKE AIR FLOW RATE IN AN INTERNAL COMBUSTION ENGINE

BACKGROUND OF THE INVENTION

The present invention relates to a device for detecting an intake air flow rate in an automotive engine, and more particularly to an improvement in such a device housed in a casing of an air cleaner or the like.

There has been priorly used a vortex-shedding flowmeter for ultrasonically detecting the generation frequency of von Kårmån vortices to determine the flow rate of air drawn into automotive engines. The known vortex-shedding flowmeter comprises an ultrasonic transducer or emitter for radiating ultrasonic energy into a flow of intake or suction air, and an ultrasonic transducer or receiver for receiving the ultrasonic energy as modulated by von Kårmån vortices generated in the air flow. The ultrasonic transducers are mounted on the wall of a pipe through which the suction air to be measured flows.

A typical prior air flow rate measuring construction, and an electronic apparatus therefor, is illustrated in U.S. Pat. No. 3,818,877 to Barrera. In this patent, the means by which the modulated ultrasonic energy is converted into a control signal for use with a fuel injector is disclosed.

It is known that the temperature of intake air in automotive engines rises 10 to 20 degrees Celsius in a few minutes when the engine is idling in the sun in midsummer. Since the propagation velocity of ultrasonic energy in air varies with temperature as is well known, the ultrasonic energy as it passes through the air to be measured is subjected to modulation due to both von Kårmån vortices and this temperature change while the von Kårmån vortices are being detected with air undergoing a sharp temperature rise. When the temperature distribution is uniform throughout the suction air, it is an easy task to detect only ultrasonic modulations due to the von Kårmån vortices. However, where there are temperature differences in the flow of intake air, ultrasonic modulations which are caused by the von Kårmån vortices and other ultrasonic modulations that are dependent upon the temperature differences are overlapped, resulting in difficulties in detecting only the vortex-dependent ultrasonic modulations. Therefore, the prior vortex-shedding flowmeter has been unable to detect von Kårmån vortices under such conditions.

SUMMARY OF THE INVENTION

The present invention has been designed to eliminate the delay with which the wall of a pipe passing air therethrough follows a temperature rise of the air, a delay which has caused the temperature differences described above. The present invention thus provides a device for detecting an intake air flow rate in an automotive engine, the device being suitable for use with engines in which the suction air is subjected to a wide range of temperature changes.

BRIEF DESCRIPTION OF THE DRAWINGS

FIG. 1 is a view showing the structure of a conventional flow detecting device;

FIG. 2 is a view showing the structure of another prior device; and

FIG. 3 is a view illustrative of a measurement device according to an embodiment of the present invention.

DETAILED DESCRIPTION OF THE INVENTION

The present invention will now be described with reference to the drawings. FIG. 1 shows a conventional detecting device in which a pipe 2 for detecting an air flow rate is disposed downstream of an air cleaner casing 1. FIG. 2 illustrates another prior detecting device having a pipe 2 for detecting the air flow rate and an air cleaner casing 1 housing the pipe 2. A partition 3 which divides the casing 1 into upstream and downstream regions is disposed upstream of an air detector 4. With these conventional detecting devices, air which is introduced through an air intake port 5 passed through a cleaner element (filter paper) 6, is rectified by a flow rectifier 7, and is introduced into the pipe 2 in which the rate of flow is detected by the detector 4. When the temperature of the air introduced through the air intake port 5 is subjected to an abrupt temperature change, a temperature variation of the wall of the pipe 2 is delayed with respect to the temperature change of the air. Particularly, the pipe 2 shown in FIG. 1 has its outer surface out of contact with the intake air, and hence can not rapidly follow the temperature change of the air. While the pipe 2 illustrated in FIG. 2 is kept in contact with the intake air at the inner surface thereof, the air tends to be stagnant at the outer surface. Furthermore, the heat of the pipe wall located upstream of the pipe 2 is conducted to the air cleaner casing 1. Therefore, the rate at which the temperature of the wall of the pipe 2 follows the temperature change of the intake air is relatively low.

FIG. 3 shows a device for detecting the intake air flow rate according to an embodiment of the present invention. The device includes a partition 9 disposed between a pipe 2 for measuring the air flow rate and an air cleaner casing 1 which bounds upstream and downstream regions for the air, the partition 9 being positioned downstream of the air flow detecting portion 4. A flow rate adjustment port 11 may be added in the partition with no adverse effect.

With the detecting device according to the present invention, air which is introduced through an air intake port 5 passes through an air cleaner element 6, is brought into contact with the outer surface of the pipe 2, is rectified by a flow rectifier 7, and is introduced into the pipe 2. Since the air thus drawn in is maintained in contact with the inner and outer surfaces of the wall of the pipe 2, the temperature of the pipe wall varies quickly in response to a temperature change of the intake air. Such rapid temperature response is required of the pipe wall positioned upstream of the air flow detecting portion 4. Temperature differences in the air as it leaves the detection portion 4 after the air flow rate has been detected do not adversely affect the detection of the air flow rate. Therefore, the air flow rate detection is not adversely affected even when the heat of a pipe wall positioned downstream of the pipe 2 is conducted to the air cleaner casing 1 through the partition 9 disposed downstream of the detecting portion 4.

With the arrangement of the present invention, as described above, there is provided a detector for detecting the intake air flow rate of an engine, the detector being mounted in a casing into which air for the engine is introduced, and a partition 9 is disposed between the detector and the casing which bounds upstream and downstream regions of the air, the partition 9 being positioned downstream of a detecting portion 4 of the detector. The temperature of a pipe 2 of the detector can thus follow the air temperature at an improved rate. The detector can therefore stably detect the flow rate of the air even when the temperature of the intake air is changed abruptly. Accordingly, the device of the invention is highly suitable for use as a device for detecting the intake air flow rate in an automotive engine.

What is claimed is:

1. A device for detecting an intake air flow rate in an internal combustion engine, comprising:
   a casing into which intake air is introduced;
   a detector for detecting the air flow rate;
   an air conduit housing said detector; and
   a partition blocking off a section of said casing and being penetrated on its upstream side by said conduit for bounding upstream and downstream regions of the intake air, said partition being positioned downstream of the air flow detecting portion of said detector.

2. A device according to claim 1, in which said detector comprises a vortex-shedding flowmeter for ultrasonically detecting von Kármán vortices.

3. A device according to claims 1 or 2, in which said casing comprises an air cleaner casing for the internal combustion engine.

4. A device according to claim 1, wherein the outer surface of said air conduit housing said detector is located in the path of intake air, whereby said conduit rapidly assumes the temperature of said intake air.

5. A device according to claims 1 or 4, an air flow into said casing being substantially perpendicular to an air flow through said detector.

6. A device according to claim 1, said partition being connected to said detector at one end thereof.

* * * * *